July 2, 1940.   A. G. ROSE   2,206,264
TURF-PIERCING MACHINE
Filed Nov. 28, 1939   4 Sheets-Sheet 1

Inventor
Alfred German Rose
by his attys.
Stebbins, Blenko & Parmelee

July 2, 1940.  A. G. ROSE  2,206,264
TURF-PIERCING MACHINE
Filed Nov. 28, 1939  4 Sheets-Sheet 3

Inventor
Alfred German Rose
by his attys
Stebbins, Blenko & Parmelee

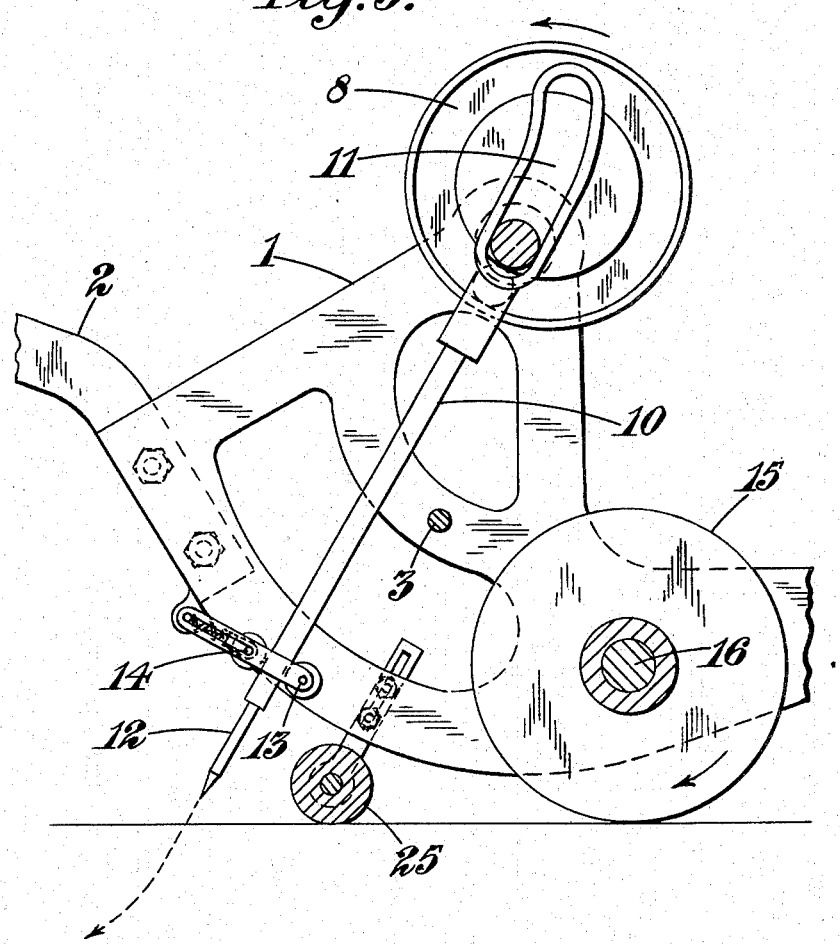

Patented July 2, 1940

2,206,264

UNITED STATES PATENT OFFICE 2,206,264

TURF-PIERCING MACHINE

Alfred German Rose, Gainsborough, England, assignor to Rose Brothers (Gainsborough) Limited, Gainsborough, England, a British company Application November 28, 1939, Serial No. 306,491
In Great Britain September 10, 1938

16 Claims. (Cl. 97—44)

This application was filed in Great Britain on September 10, 1938, Serial No. 30,761/38 which was filed in Great Britain on October 25, 1938, and Serial No. 1,673/39 which was filed in Great Britain on January 18, 1939.

The invention is concerned with a machine for aerating turf by piercing and has for an object the provision of a machine which pierces the turf without tearing it unduly. A further object is the provision of a turf-piercing machine which at the same time lifts the turf.

The invention relates to turf-piercing machines of the kind in which a set of tines are, by axial reciprocatory movements, pushed into the turf and then withdrawn as the machine travels over the turf on a roller or wheels.

The invention consists in a machine of the above kind which is characterised in that the tines are so directed and their reciprocatory movements are such that the tines enter the turf in the backwards direction of the movement of the machine at an angle to the surface of the turf. Preferably the tines are directed at an angle of about 60° to the surface of the turf.

In order that the machine may lift the turf means may be included for giving the tines a bodily movement in an upwards direction while they are in the turf or the machine may be so arranged that the angle of the tines in relation to the surface of the turf is varied (either positively or by the forward movement of the machine) as they approach the end of their movement in such manner as to tend to lift the turf.

One specific machine according to the invention and some modifications thereof will now be described by way of example and with reference to the accompanying drawings in which:

Figure 5 is a view also similar to Figure 3 but showing a still further modification.

Like reference numerals indicate like parts in the several figures of the drawings.

Figure 1:
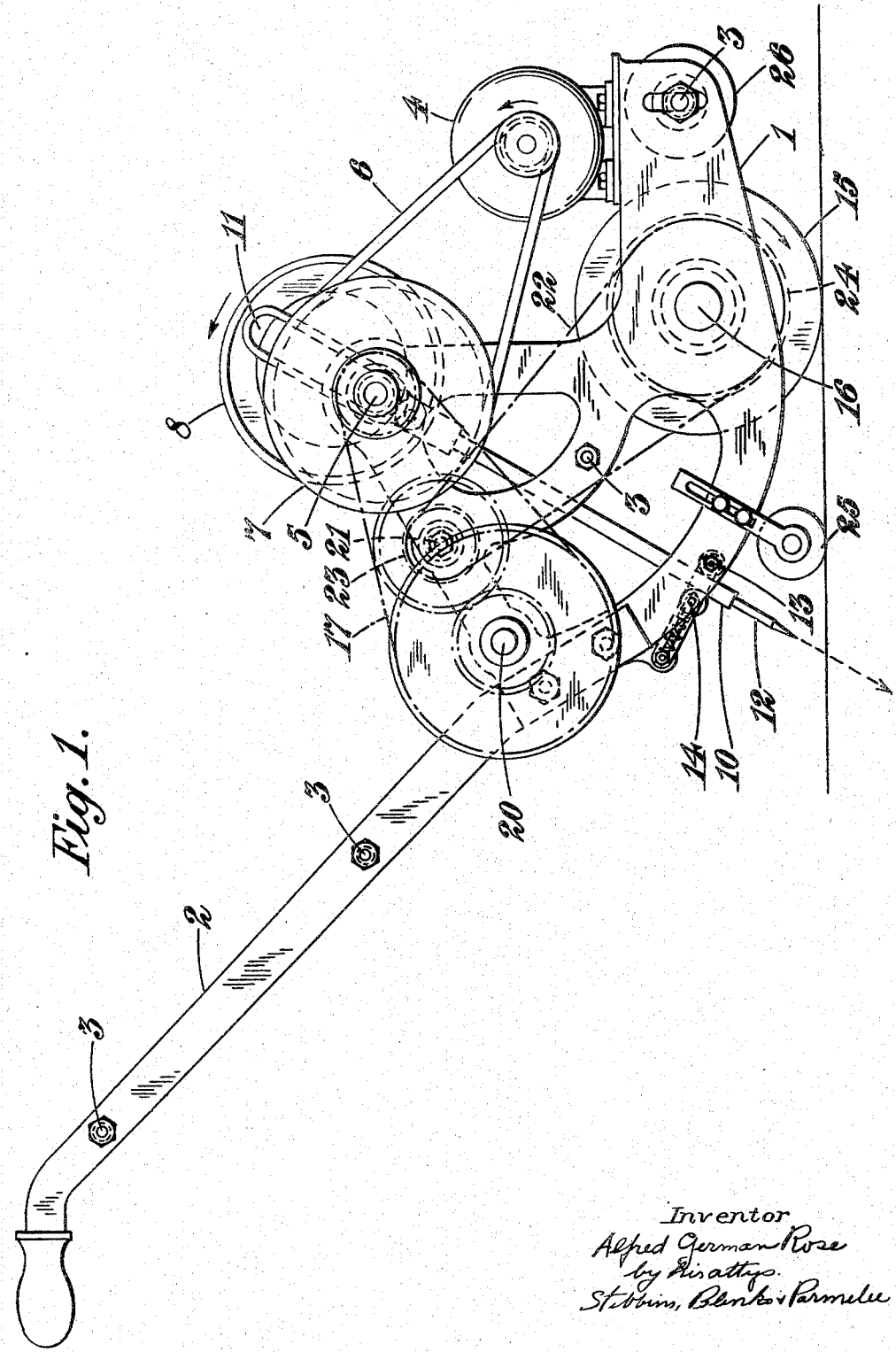
Figure 1 is a side view of the machine.
Figure 2:
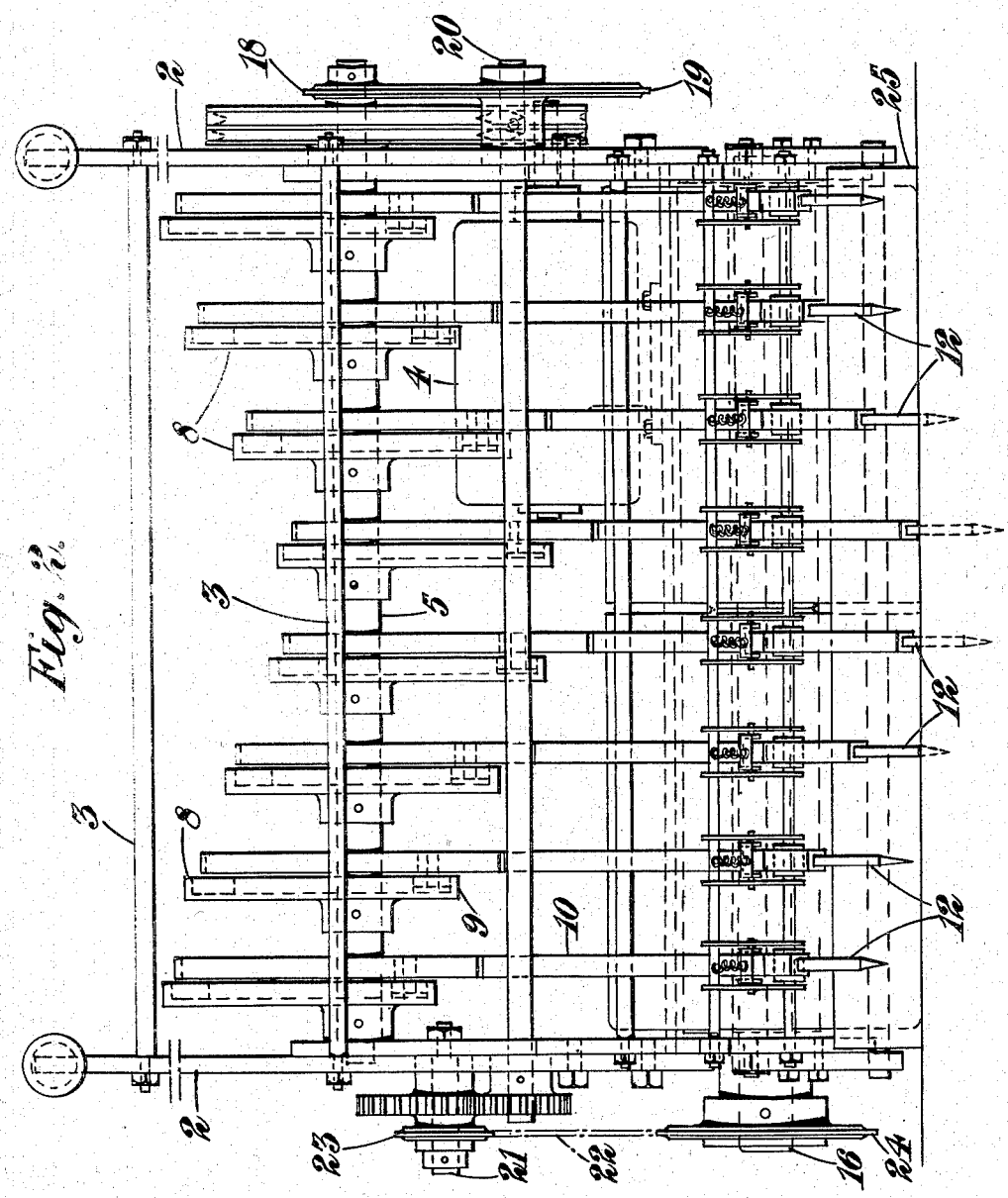
Figure 2 is a view showing the back of the machine.

The machine shown in Figures 1 and 2 has a frame composed of two side plates 1 to which are secured handles 2, the plates and handles being connected by cross bars 3.

Carried on a platform at the forward end of the frame there is a motor 4 which may for example be a petrol engine or an electric motor which is arranged to drive a cam shaft 5 by means of a belt 6 driving a pulley 7 fixed to the cam shaft. The cam shaft carries a set of cams 8 having eccentric cam grooves of which the points of maximum displacement are arranged at successive positions around the shaft. In the particular machine shown in the drawings there are eight cams and each co-operates with a roller 9 located in the cam groove and carried on a rod 10. The rods 10 are slotted as shown at 11 for the reception of the cam shaft 5. The rods 10 carry the tines 12 at their lower ends and they extend at an angle of about 60° to the surface of the turf. Guide rollers 13 and 14 are provided on the frame for guiding the rods 10 at a position just above the tines. The rollers 14 which are carried on non-rotatable spindles slidable in slotted guides are spring-pressed into engagement with the rods to allow the rods to make a small swinging movement about the cam shaft as the machine moves forward while the tines are in the turf.

A divided roller 15 mounted on a cross shaft 16 in the frame is provided for supporting the machine on the turf. This roller is driven from the motor 4 to cause the machine to travel over the turf. The driving connection to the roller consists of a chain 17 engaging a sprocket 18 on the cam shaft and a sprocket 19 on a lay shaft 20, a geared connection between the lay shaft 20 and a second lay shaft 21 and a chain 22 connecting a sprocket 23 on the lay shaft 21 with a sprocket 24 on the shaft 16. The ratio of the driving connection between the cam shaft and the driving roller 15 controls the pitch of the holes made in the turf and by altering this ratio the pitch of the holes may be varied. A suitable ratio is such that the cam shaft rotates once and therefore causes the tines to pierce the turf once for each two inches of forward movement of the machine. If desired a clutch may be included in the driving connection between the cam shaft and the roller 15. For example the lay shaft 20 may be divided in its length and the clutch may be arranged to disconnect the two portions of the shaft when it is desired to stop the forward movement of the machine.

Located behind the driving roller 15 there is a supporting roller 25. This roller is adjustable in height in relation to the frame and is so positioned that when the machine is resting on the two rollers 15 and 25 the tines will be pressed into the turf by the cams an amount (e. g., four to six inches) depending upon the adjustment of the roller 25.

In front of the roller 15 there is a third roller 26 which, when the machine is in operation, is lifted clear of the ground. If it is desired to move the machine without the tines entering into the turf then it is rocked about the roller 15 until it rests on this roller and on the roller 26. In this position the tines are lifted so far off the ground that they do not come into contact with it.

The movement given to the tines by the cams 8 in the form of the machine just described is entirely an axial one. However as the machine advances on the turf the tines tend to lag behind (the tendency being accommodated by the rollers 13) and to make a pivotal movement, usually about an axis at the surface of the turf. The effect of this pivotal movement is to lift the pointed ends of the tines and therefore to lift the turf.

Figure 3:
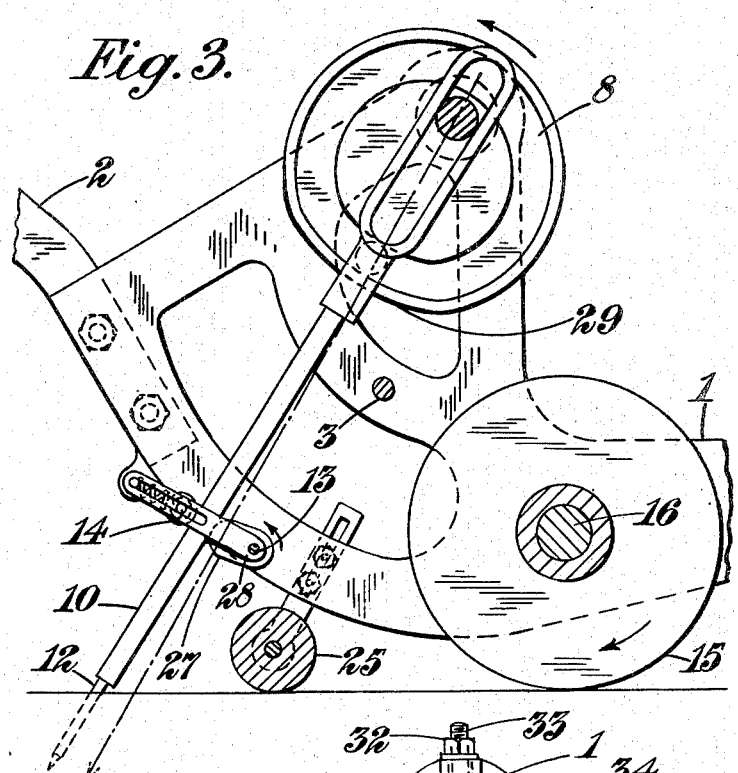
Figure 3 is a side view partly in section showing a modification of the machine shown in Figures 1 and 2.

In the modified form of the above machine shown in Figure 3 the rollers 13 are replaced by a set of cams 27 on a shaft 28 which is driven at the same speed as the cam shaft 5 by a driving chain which is not shown in the drawings. The cams 27 are shaped and positioned in such manner that as the shaft 28 is rotated they press the rods 10 and with them the tines 12 upwardly and backwardly at a time corresponding with the end of the downward stroke of the tines. This has the effect of lifting the turf and breaking up the subsoil. The positions of the tines before and after they have been lifted by the cams 27 are shown by the chain line and the dotted line respectively. In order to increase this effect the cams 8 have a portion 29 of constant height at their position of maximum throw which causes a "dwell" in the movement of the tines when they are in position in the turf.

Figure 4:
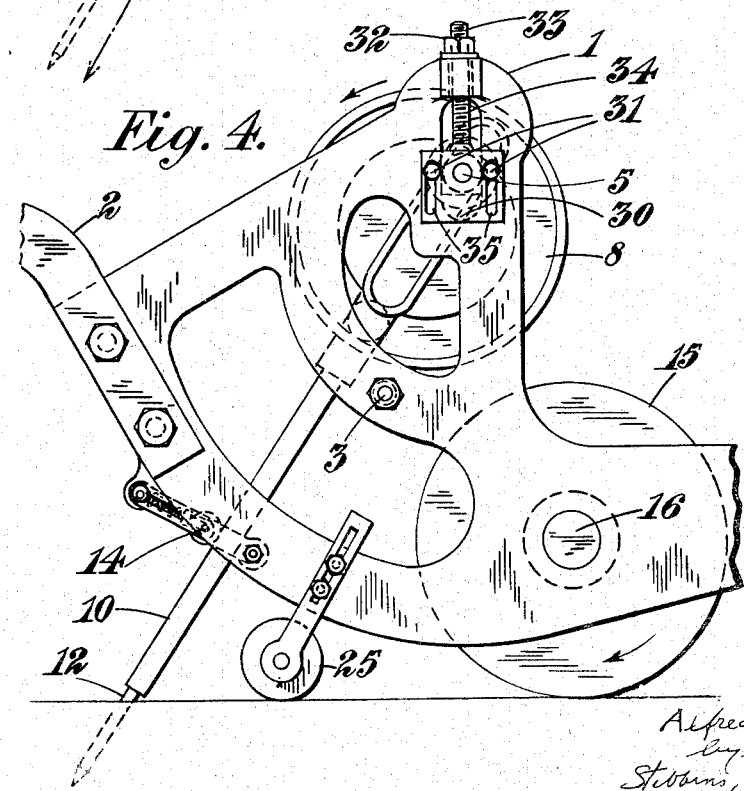
Figure 4 is a view similar to Figure 3 but showing a further modification.

Figure 4 shows a modification of the above machine in which the height of the cam shaft 5 is adjustable. For this purpose the ends of the shaft are supported in bearings 30 which are normally clamped to the side plates 1 by bolts 31. When it is desired to raise or lower the cam shaft, the bolts 31 are loosened and the bearings raised or lowered to the desired extent by means of nuts 32 on studs 33 attached to the bearings. To allow of this movement the cam shaft 5 passes through slots 34 in the side plates and slots 35 are provided in the bearings for the bolts 31. The effect of varying the height of the cam shaft is to adjust the depth to which the tines enter the turf and also to vary to some extent the angle at which the tines enter the turf and the amount by which the turf is lifted.

Another way of increasing the lifting effect of the tines is illustrated in Figure 5. In this construction the slots 11 in the rods 10 are curved at their upper ends as shown, with the result that as the tines move downwardly under the action of the cams the angle at which they enter the ground is varied. The path of the point of the tine shown in the figure is indicated by the dotted line.

It is to be understood that the invention is not restricted to the precise constructional details set forth in the above examples. For instance the driving connection from the motor to the supporting roller 15 may be omitted. In this case the machine is pushed over the turf by the operator while the tines are reciprocated by the motor. Again if desired the motor may be omitted entirely and the arrangement be such that the rotation of the supporting roller as the machine is pushed over the ground causes the reciprocation of the tines.

I claim:

1. A turf-piercing machine comprising a frame, travelling gear supporting the frame and on which the machine may travel over the turf, a set of tines also carried by the frame and means for giving reciprocatory movements to the tines in an axial direction thereof to force them into and out of the turf, as the machine travels on the gear, in such manner that they enter the turf in the backwards direction of the movement of the machine at an angle to the surface of the turf.

2. A turf-piercing machine comprising a frame, a supporting roller carried by the frame and on which the machine may travel over the turf, a set of tines also carried by the frame and means for giving reciprocatory movements to the tines in an axial direction thereof to force them into and out of the turf, as the machine travels on the roller, in such manner that they enter the turf in the backwards direction of the movement of the machine at an angle to the surface of the turf.

3. A turf-piercing machine comprising a frame, travelling gear supporting the frame and on which the machine may travel over the turf, a set of tines also carried by the frame and means for giving reciprocatory movements to the tines in an axial direction thereof to force them into and out of the turf, as the machine travels on the gear, in such manner that they enter the turf in the backwards direction of the movement of the machine at an angle of about 60° to the surface of the turf.

4. A turf-piercing machine comprising a frame, travelling gear supporting the frame and on which the machine may travel over the turf, a set of tines also carried by the frame, means for giving reciprocatory movements to the tines in an axial direction thereof to force them into and out of the turf, as the machine travels on the gear, in such manner that they enter the turf in the backwards direction of the movement of the machine at an angle to the surface of the turf and means for giving the tines a bodily movement in an upwards direction while they are in the turf.

5. A turf-piercing machine comprising a frame, travelling gear supporting the frame and on which the machine may travel over the turf, a set of tines also carried by the frame, means for giving reciprocatory movements to the tines in an axial direction to force them into and out of the turf, as the machine travels on the gear, in such manner that they enter the turf in the backwards direction of the movement of the machine at an angle to the surface of the turf, and means for varying the angle of the tines in relation to the surface of the turf as they approach the end of their movement into the turf and thereby to tend to lift the turf.

6. A turf-piercing machine comprising a frame, a supporting roller carried by the frame and on which the machine may travel over the turf, a set of tines, means for supporting the tines on the frame in such manner as to allow of reciprocatory movements of the tines in the axial direction thereof and also to allow of a swinging movement of the tines about a centre remote from the piercing end thereof and means for giving reciprocatory movements to the tines in an axial direction to force them into and out of the turf, as the machine travels on the roller, in such manner that they enter the turf in the backwards direction of the movement of the machine at an angle to the surface of the turf and are allowed while in the turf to make a small swinging movement in the backwards direction as the machine advances.

7. A turf-piercing machine comprising a frame, two supporting rollers carried by the frame and on which the machine may travel over the turf, the rollers being spaced apart in the direction of travel, a set of tines also carried by the frame and means for giving reciprocatory movements to the tines in an axial direction thereof to force them into and out of the turf, as the machine travels on the rollers, in such manner that they enter the turf in the backwards direction of the movement of the machine at an angle to the surface of the turf.

8. A turf-piercing machine as claimed in claim 7 in which one of the rollers is adjustable as to height in relation to the frame to vary the depth of penetration of the tines into the turf.

9. A turf-piercing machine comprising a frame, a supporting roller carried by the frame and on which the machine may travel over the turf, a set of tines also carried by the frame, means for giving reciprocatory movements to the tines in an axial direction thereof to force them into and out of the turf, as the machine travels on the roller, in such manner that they enter the turf in the backwards direction of the movement of the machine at an angle to the surface of the turf, and two additional supporting rollers one in front of and the other behind the first supporting roller in the direction of movement, the three rollers being spaced apart in the direction of movement and arranged at different running levels such that when the machine is running on one pair of the rollers the tines engage the turf and when it is running on another pair of the rollers the tines are lifted clear of the turf.

10. A turf-piercing machine as claimed in claim 1 in which the means for effecting the reciprocatory movements of the tines include cams which are so shaped as to cause a "dwell" in the movement of the tines when they are in position in the turf.

11. A turf-piercing machine as claimed in claim 1 in which the means for reciprocating the tines include a series of cams carried on a common shaft which is supported by the frame and which may be adjusted in position on the frame in the vertical direction.

12. A turf-piercing machine as claimed in claim 1 and including a motor arranged to drive the supporting roller and also to operate the means for reciprocating the tines.

13. A turf-piercing machine comprising a frame consisting of two spaced side plates connected by cross bars and provided with guiding handles, two spaced supporting rollers carried on shafts extending between the side plates of the frame and on which the machine may travel over the turf, a cam shaft extending between the side plates, a plurality of rods each having a longitudinal slot at one end within which the cam shaft is engaged to serve as a guide for the rod, guide means arranged to constrain the rods to extend downwardly and backwardly of the machine while allowing movement of the rods in an axial direction, a plurality of tines one on the lower end of each rod, a set of cams on the cam shaft engaging followers on the rods and arranged to impart axial reciprocatory movements to the rods as the cam shaft is rotated, and means for rotating the cam shaft as the machine is advanced over the turf to push the tines into the turf in a backwards direction at an angle to the surface of the turf and then to withdraw them.

14. A turf-piercing machine as claimed in claim 13 in which the guide means for the rods are arranged to allow of a small swinging movement of the rods about the cam shaft.

15. A turf-piercing machine as claimed in claim 13 and including a third supporting roller in front of the two rollers aforesaid and at a higher level than the two rollers when the machine is in operating position on the turf such that by rocking the machine about the center roller until it rests on the centre roller and the said third roller the tines may be lifted clear of the turf.

16. A turf-piercing machine as claimed in claim 13 and so constructed and arranged that the tines enter the turf behind the supporting rollers as the machine is advanced over the turf.

ALFRED GERMAN ROSE.